United States Patent
Maffeis et al.

(10) Patent No.: US 7,489,704 B2
(45) Date of Patent: *Feb. 10, 2009

(54) MESSAGING SYSTEM FOR DELIVERING DATA IN THE FORM OF PORTABLE MESSAGE FORMATS BETWEEN MESSAGE CLIENTS

(75) Inventors: Silvano Maffeis, Baden (CH); Thomas Haas, Zürich (CH)

(73) Assignee: Softwired, Inc., Zurich (CH)

( * ) Notice: Subject to any disclaimer, the term of this patent is extended or adjusted under 35 U.S.C. 154(b) by 591 days.

This patent is subject to a terminal disclaimer.

(21) Appl. No.: 10/907,328

(22) Filed: Mar. 29, 2005

(65) Prior Publication Data

US 2005/0223108 A1    Oct. 6, 2005

Related U.S. Application Data

(62) Division of application No. 09/498,505, filed on Jan. 28, 2000, now Pat. No. 6,877,023.

(51) Int. Cl.
*H04J 3/16* (2006.01)
*G06F 15/16* (2006.01)
(52) U.S. Cl. ...................... 370/466; 709/203
(58) Field of Classification Search ................. 370/466
See application file for complete search history.

(56) References Cited

U.S. PATENT DOCUMENTS

| | | | |
|---|---|---|---|
| 5,224,098 A * | 6/1993 | Bird et al. ................ | 709/233 |
| 5,680,551 A | 10/1997 | Martino, II | |
| 5,752,042 A * | 5/1998 | Cole et al. ................ | 717/173 |
| 5,860,551 A | 1/1999 | Knott, Sr. | |
| 5,948,066 A | 9/1999 | Whalen et al. | |
| 5,987,256 A | 11/1999 | Wu et al. | |
| 6,108,696 A | 8/2000 | Mendhekar et al. | |

(Continued)

FOREIGN PATENT DOCUMENTS

DE    196 32 258 C    12/1997

(Continued)

OTHER PUBLICATIONS

Maffeis, Silvano et al. A Generic Multicost Transport Service to Support Disconnected Operation. (1996).

(Continued)

*Primary Examiner*—Andrew Lee
(74) *Attorney, Agent, or Firm*—Oppedahl Patent Law Firm LLC

(57) ABSTRACT

A messaging system is disclosed for the purpose of delivering data in the form of a portable message format from a producer of any kind, over any transport protocol, using any delivery guarantee, to one or more recipients of any kind. The method for running said message system includes a message broker with at least one pluggable protocol adapter. It may also comprises at least one pluggable message format adapter and at least one pluggable message content adapter, thus enabling to use a simple unified topic or queue abstraction between the involved communication parties. Specifically, the method includes protocol adapters, message format adapters and message content adapters to wireless networks and devices, as well as message adapters to convert the portable messages between the different formats used in different computer programming languages.

15 Claims, 1 Drawing Sheet

U.S. PATENT DOCUMENTS

| | | |
|---|---|---|
| 6,115,741 A | 9/2000 | Domenikos et al. |
| 6,119,167 A | 9/2000 | Boyle et al. |
| 6,122,671 A | 9/2000 | Farrar, Jr. et al. |
| 6,141,686 A | 10/2000 | Jackowski et al. |
| 6,167,449 A | 12/2000 | Arnold et al. |
| 6,173,327 B1 * | 1/2001 | De Borst et al. ............ 709/231 |
| 6,253,367 B1 | 6/2001 | Tran et al. |
| 6,256,635 B1 | 7/2001 | Arrouye et al. |
| 6,256,676 B1 | 7/2001 | Taylor et al. |
| 6,278,707 B1 * | 8/2001 | MacMillan et al. ......... 370/352 |
| 6,321,338 B1 | 11/2001 | Porras et al. |
| 6,324,564 B1 | 11/2001 | Thielke et al. |
| 6,343,287 B1 | 1/2002 | Kumar et al. |
| 6,347,340 B1 | 2/2002 | Coelho et al. |
| 6,351,771 B1 | 2/2002 | Craddock et al. |
| 6,363,421 B2 * | 3/2002 | Barker et al. ................ 709/223 |
| 6,373,327 B1 * | 4/2002 | Nakamura .................. 327/536 |
| 6,385,644 B1 * | 5/2002 | Devine et al. ............... 709/206 |
| 6,393,014 B1 | 5/2002 | Daly et al. |
| 6,405,262 B1 * | 6/2002 | Vogel et al. ................. 719/315 |
| 6,424,841 B1 | 7/2002 | Gustafsson |
| 6,453,320 B1 | 9/2002 | Kukura et al. |
| 6,466,974 B1 | 10/2002 | Nelson et al. |
| 6,473,759 B1 | 10/2002 | Herrendoerfer et al. |
| 6,522,641 B1 | 2/2003 | Siu et al. |
| 6,549,773 B1 | 4/2003 | Linden et al. |
| 6,658,476 B1 * | 12/2003 | Van ............................ 709/230 |
| 7,180,863 B1 * | 2/2007 | Bauer et al. ................. 370/237 |
| 2001/0014910 A1 | 8/2001 | Bobo, II |
| 2002/0049858 A1 | 4/2002 | Frietas et al. |
| 2002/0178126 A1 | 11/2002 | Beck et al. |

FOREIGN PATENT DOCUMENTS

| | | |
|---|---|---|
| EP | 0 600 235 | 6/1994 |
| WO | WO 98/07260 | 2/1998 |
| WO | WO 99/11043 | 3/1999 |
| WO | 0156234 | 8/2001 |

OTHER PUBLICATIONS

Campbell, Andrew T. et al. Managing Complexity: Middleware Explained, IT PRO, Sep. 30, 1999, pp. 22-28, XP002192898.

Softwired AG, Developing Publish/Subscribe Applications with iBus-Technical White Paper, http://www.softwired-inc.com.

* cited by examiner

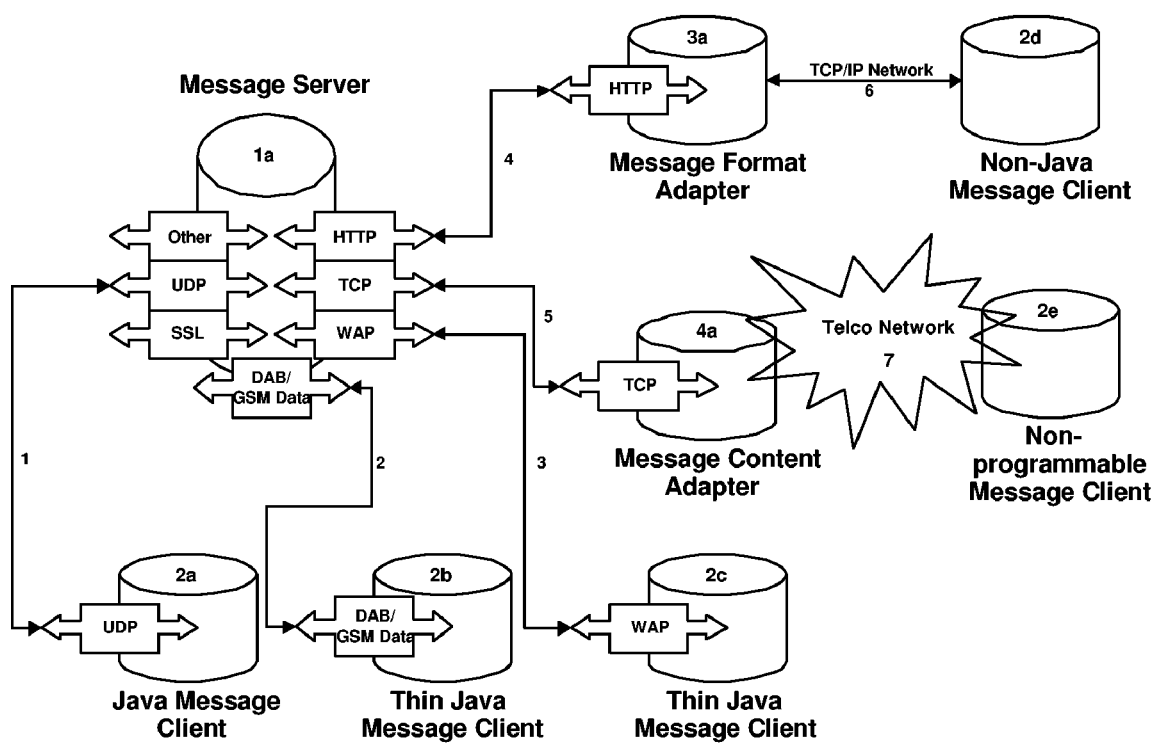

MESSAGING SYSTEM FOR DELIVERING DATA IN THE FORM OF PORTABLE MESSAGE FORMATS BETWEEN MESSAGE CLIENTS

CROSS-REFERENCE TO RELATED APPLICATIONS

This application claims priority from U.S. application Ser. No. 09/498,505, filed Jan. 28, 2000, which application is hereby incorporated herein by reference for all purposes.

FIELD OF THE INVENTION

The invention relates to techniques for the delivery of electronic messages between hardware or software components over any kind of network (wired and wireless), between any kind of devices.

BACKGROUND OF THE INVENTION

Message oriented middleware (MOM) has been available for many years. In October 1998, an industry standard emerged from Sun Microsystems, the Java Message Service (JMS). At a programming interface level, this standard describes how a messaging middleware is accessed from a piece of Java code. The two main abstractions are "topics" (publish/subscribe messaging) and "queues" (point-to-point messaging). While the standard describes the interface to the messaging middleware, the implementation of the middleware is not specified. Also, integration of non-Java programming languages is not specified, and integration of non-programmable messaging devices (such as phones or pagers) are not specified.

Existing messaging middleware allows one to access the middleware over a fixed, small number of transport protocols. These are usually TCP or SSL. Supporting a new protocol requires the vendor of the middleware to implement it and to integrate it into the middleware. Non-Java devices may or may not be supported, but again, extending the middleware for as yet unsupported devices requires the vendor of the middleware to enable it. Non-programmable devices are unsupported in current messaging middleware products.

This leads to:
Performance impacts, as TCP or SSL are unicast transport protocols, while the publish/subscribe pattern is a multicast abstraction.
Limited applicability, as devices using a new kind of transport protocol are not supported. This is especially true for wireless small devices, such as PDAs or mobile phones, which today cannot be part of a uniform messaging infrastructure.
Limited applicability, as non-programmable devices (such as a mobile phones with a built-in messaging function, e.g. Short Message Service (SMS)) cannot participate in a uniform messaging infrastructure.
A limited choice of message delivery guarantees, resulting in potentially too strong guarantees (which are too expensive) or too weak guarantees (too many messages are lost undetected). This is inadequate especially for wireless networks.
No support of asymmetrical networks, such as a cheap, best-effort bulk downlink for the actual delivery of messages, and a more expensive, reliable uplink for control data to implement the desired quality of service, i.e. message delivery guarantee.

OBJECT OF THE INVENTION

A first object of the invention is to provide a messaging system for the delivery of data in the form of portable message formats between message clients using transport protocol adapters and any kind of network. Another object of the invention is to provide a method for messaging simple logical communication topics or message queues that are independent of transport protocols, delivery guarantees, message format, and message content limitations. Another object of the invention is to provide a computer program product directly loadable into the memory of a computer usable for running a messaging system.

SUMMARY OF INVENTION

The messaging system outlined in this disclosure is a major technological advancement enabling users to deliver messages over any transport protocol, using an optimized message delivery guarantee, and to any kind of device.

A messaging system is disclosed for delivering data in the form of portable message formats from a producer of any kind, over any transport protocol, using any delivery guarantee, to one or more recipients of any kind. The method for running said message system includes a message broker with a system architecture of at least one pluggable protocol adapter. Said system architecture may comprise also at least one pluggable message format adapter and at least one pluggable message content adapter, thus enabling to use a simple unified topic or queue abstraction between the involved communication parties.

Specifically, the method includes protocol adapters, message format adapters, and message content adapters to wireless networks and devices, as well as message adapters to convert the portable message between the different formats used in different computer programming languages. Data may be delivered using asymmetric networks where the forward and return channels may be realized using two simplex channels, and networks with only a unidirectional channel.

The invention comprises also a computer program product directly loadable into the memory of a computer usable for running a messaging system.

BRIEF DESCRIPTION OF THE DRAWINGS

FIG. 1 provides a block diagram of a preferred embodiment of the present invention. It consists of:
A message server 1a.
A java message client 2a, connected via an IP multicast connection 1.
A Thin Java message client 2b, connected over an asymmetric wireless transport protocol 2.
A Thin Java message client, 2c, connected over a wireless transport protocol 3.
A Non-Java message client 2d, connected over a Network 6 link to the message format adapter 3a.
A non-programmable message client 2e, connected over a telecommunications network (e.g. GSM) 7 to the message content adapter 4a.
A message format adapter 3a, connected to the message server via an HTTP connection 4.
A message content adapter 4a, connected to the message server via a TCP connection 5.

DETAILED DESCRIPTION

The block diagram is but one example of a messaging infrastructure deployment. Any number of message servers, message clients, message format adapters and message content adapters can be present in a specific installation.

The message server 1a maintains client connections, administers client subscriptions to topics and queues, receives and forwards messages, and stores persistent messages in its database. These activities are standard activities of a message server.

The message server 1a comprising at least one pluggable transport protocol adapter. FIG. 1 shows an example of six specific transport protocol adapters (UDP, SSL, HTTP, TCP, WAP, DAB/GSM Data). A placeholder is present (labeled "Other") for any number of additional protocol adapters.

On startup, the message server 1a reads its configuration data, and initializes all configured protocol adapters. At runtime, additional protocol adapters can be started, or running protocol adapters can be stopped, without interrupting the message server service (however, if a specific protocol adapter is stopped, service over this adapter is no longer available).

At least one message client 2a-2e connects to the message server 1a using its configured protocol adapter. If a matching protocol adapter is running on the server, the connection is successful. Further communication between message client and message server is according to the familiar publish/subscribe or point-to-point pattern of JMS.

JMS topics or JMS queues are named and administered independently of the protocol adapters involved. If a client connects to the server using the "TCP" protocol adapter, it can communicate with a client that connected using the "UDP" protocol adapter, if both clients use the same JMS topic or queue.

The protocol adapters encapsulate at least one logic needed to:

Interface with a transport protocol, such as HTTP, TCP or GSM Data.

Specify and guarantee a quality of service for the message delivery.

Certain transport protocols operate in a "best effort" delivery mode. Thus, simply adapting to a specific protocol is not always enough (unless "best effort" is the desired message delivery guarantee). Thus, protocol adapters consist of both the transport protocol mechanism, and a quality of service mechanism to improve the basic network delivery guarantee.

The Java message clients 2a-2c implements the JMS API from Sun Microsystems. It cooperates with the message server to achieve full JMS functionality.

Specific to the present invention is the pluggable transport protocol adapter architecture. A message client 2a-2e can use any transport protocol adapter to communicate with the message server 1a. The necessary code to implement a specific transport protocol adapter can be acquired at runtime, for example using a java classloader mechanisms, using a lookup service such as JINI, or using a directory service via JNDI.

The thin Java message client 2b,2c is a compact version of a Java message client. It is able to operate without any network support from the Java environment. Specifically, the java.net, java.io and java.rmi libraries are not required. This is possible because of the pluggable transport protocol adapter architecture. The protocol adapter to access e.g. an infrared port on a mobile device directly interfaces with the infrared hardware. Thus, it does not require any TCP/IP emulation on top of the infrared hardware to be present.

The Non-Java message client 2d connects for example via a TCP link to the message format adapter. It consists of aJMS-like programming library, that offers to non-Java devices JMS functionality, as well as full integration with Java message clients.

The non-programmable message client 2e is any device that has its own method to interchange messages with other devices. Examples include:
GSM Phones, using the Short Message Service (SMS).
Alphanumeric pagers.
WAP enabled phones.

A non-programmable message client 2e needs for example a specific message content adapter to integrate into the messaging system, i.e. to exchange messages with other client types.

The JMS message format is specific to Java and JMS. Non-Java programmable clients need a translation engine to convert the Java message into a message they can deal with. This translation engine is the message format adapter 3a. According to FIG. 1, the message format adapter 3a is a generic proxy. On one side, it connects to the message server 1a using any pluggable transport protocol adapter. On the other side, it communicates with the Non-Java message client 2d using a command protocol over a communication such as TCP/IP. The command protocol supports the entire JMS command set, such as "publish" or "subscribe". JMS object messages are introspected using the Java introspection mechanism. The result of the introspection is translated into a byte stream and exchanged with the Non-Java message client 2d over the TCP/IP link.

Non-programmable clients usually have restrictions regarding the size and format of the messages they support. For example, the GSM SMS specification allows only text, with a maximum length of 160 characters. Additionally, the non-programmable clients don't follow JMS, or the publish/subscribe or point-to-point programming pattern. Thus, other means for e.g. topic registration must be used.

The message content adapter 4a is described generically, but must be specifically adapted to each non-programmable message client. There is e.g. a SMS message content adapter, a WAP message content adapter or a pager message content adapter.

According to FIG. 1, the message content adapter 4a is a proxy that on one side connects to the message server 1a using any pluggable transport protocol adapter. On the other side, it communicates either directly with the non-programmable message clients, or with existing telecommunications equipment (such as an SMS gateway) that then communicates with the non-programmable message clients.

Topic subscription is handled with a specific command protocol. In some cases, this command protocol must be known to the user (e.g. with SMS a message "subscribe:/news/sports/" needs to be sent to a specific service number). In other cases, the subscription command can be hidden from the user (e.g. with WAP, the actual subscription command can be hidden below a descriptive link).

Message adaptation is done with knowledge of the properties of the non-programmable message client. E.g. a GSM phone using SMS needs to receive a text string of at most 160 characters. An incoming Java message is thus introspected, and text content is extracted. If the text content is more than 160 messages, it is truncated. In the other direction, a published SMS message is converted into aJMS text message. Likewise scenarios exist for other non-programmable message clients.

As the messaging system comprises a computer, a computer program product comprising a software code for performing the steps of the invention can be directly loaded into the memory of said computer of the messaging system.

One example of such a messaging system is applicant's SoftWired iBus//MessageServer computer program product. This computer program product is being delivered in the form of an installable software packet. This software packet is installed on a hardware server such as a common Intel-based PC or a Sun Sparc based Unix computer. This computer program product is directly loadable into the memory of such a computer. After installation, a message server 1a can be started. As part of the message server, at least one pluggable transport protocol adapters is being delivered. Transport protocol adapters are in the form of a set of software components, i.e. Java classes. One example is the protocol adapter for the "reliable IP multicast" transport, which consists of the Java classes DISPATCH, FRAG, FIFO, NAK, REACH and IPM-CAST. By configuring/implementing the above classes in the proper order in the message server configuration file, the "reliable IP multicast" transport adapter is initialized and started/plugged at runtime by the message server.

In summary, any number of protocol adapters can be activated in the message server by specifying them in the server configuration file and by delivering and installing the necessary Java classes to implement the protocol adapter.

Java Message Clients or Thin Java Message Clients implement the necessary logic in the form of a of a library, i.e. a Java Archive (JAR). This Java Archive is installed and started on a client computer. Protocol adapters are implemented and configured the same way as on the server, i.e. configured in a configuration file and delivered in the form of Java classes. The Java classes can be part of the Java Archive or can be downloaded at runtime from a web server.

A Message Format Adapter is in essence a special form of a java Message Client. Thus, it consists of the same components as a java Message Client and is configured the same way. In addition, it contains programming logic to reformat and route messages from and to the non-Java Message Clients.

A Message Content Adapter is in essence also a special form of a Java Message Client. Thus, it consists of the same components as a Java Message Client and is configured the same way. In addition, it contains programming logic to analyze, reformat and route messages from and to the non-programmable Message Clients.

GLOSSARY OF TERMS USED

Terms used include the following:
TCP: Transmission Control Protocol
UDP: User Datagram Protocol
IP: Internet Protocol
HTTP: Hypertext Transfer Protocol
WAP: Wireless Application Protocol
SSL: Secure Socket Layer
JMS: Java Message Service
PDA: Personal Digital Assistant
SMS: Short Messaging Service
GSM: Global System for Mobile Telecommunication
DAB: Digital Audio Broadcast

What is claimed is:

1. A method for operating a messaging system for delivering data in the form of messages between message clients, comprising the steps of
 a message server maintaining client connections, administering client subscriptions to at least one of topics or queues, and the message server receiving and forwarding messages;
 the message server initializing and starting a first transport protocol adapter of a plurality of transport protocol adapters;
 at least one message client connecting to the message server using a second transport protocol adapter which matches the first transport protocol adapter; and
 the message client and the message server communicating by means of the first and second transport protocol adapter and using one of a publish/subscribe pattern or a point-to-point pattern.

2. The method of claim 1, further comprising the step of the message client starting and stopping transport protocol adapters at runtime.

3. The method of claim 1, further comprising the step of the transport protocol adapters specifying and guaranteeing a quality of service for the message delivery.

4. The method of claim 1, further comprising the steps of running the message client on a mobile client; and
 the message client and the message server communicating over a wireless transport protocol.

5. The method of claim 4, further comprising the step of the transport protocol adapter on the mobile client directly accessing a hardware port of the wireless mobile device when communicating over the wireless transport protocol.

6. The method of claim 4 or claim 5, further comprising the step of
 the transport protocol adapters communicating by means of UDP (User Datagram Protocol) or SSL (Secure Socket Layer) or HTTP (Hypertext Transfer Protocol) or TCP (Transmission Control Protocol) or WAP (Wireless Application Protocol) or DAB (Digital Audio Broadcast) or GSM (Global System for Mobile Telecommunication) Data or GPRS (General Packet Radio Service) or SMS (Short Messaging Service) or JIRDA (Infrared Data Association) or any combination of these transport protocols.

7. The method of claim 1, further comprising the step of at least one pluggable message content adapter analyzing, reformatting and routing messages from and to non-programmable message clients.

8. The method of claim 7, further comprising the step of at least one pluggable message format adapter reformatting and routing messages from and to non-Java Message Clients.

9. The method of claim 1, further comprising the step of the message server administering the topics and queues independently of the transport protocol adapters involved.

10. A method for operating a messaging system for delivering data in the form of messages between message clients, comprising the steps of
 a message server maintaining client connections, administering client subscriptions to at least one of topics or queues, and the message server receiving and forwarding messages;
 the message server initializing and starting a first transport protocol adapter of a plurality of transport protocol adapters;
 at least one message client connecting to the message server using a second transport protocol adapter which matches the first transport protocol adapter;
 the message client and the message server communicating by means of the first and second transport protocol adapter and using one of a publish/subscribe pattern or a point-to-point pattern;
 the message client starting and stopping transport protocol adapters at runtime;
 the transport protocol adapters specifying and guaranteeing a quality of service for the message delivery;

running the message client on a mobile client;

the message client and the message server communicating over a wireless transport protocol; and the transport protocol adapters communicating by means of UDP (User Datagram Protocol) or SSL (Secure Socket Layer) or HTTP (Hypertext Transfer Protocol) or TCP (Transmission Control Protocol) or WAP (Wireless Application Protocol) or DAB (Digital Audio Broadcast) or GSM (Global System for Mobile Telecommunication) Data or GPRS (General Packet Radio Service) or SMS (Short Messaging Service) or IRDA (Infrared Data Association) or any combination of these transport protocols.

11. A system for operating a messaging system for delivering data in the form of messages between message clients, comprising a message server for maintaining client connections, administering client subscriptions to at least one of topics or queues, and for receiving and forwarding messages;

the message server comprising a first transport protocol adapter of a plurality of transport protocol adapters and the message server being able to initialize and start the first transport protocol adapter; and the system further comprising at least one message client communicatively connected to the message server by means of a second transport protocol adapter which matches the first transport protocol adapter, and with both transport protocol adapters using one of a publish/subscribe pattern or a point-to-paint pattern.

12. The system of claim 11, wherein at least one of the transport protocol adapters is pluggable for being started and/or stopped at runtime of the message server.

13. The system of claim 11, wherein said message clients are Non-Java message clients, connected over a TCP/IP link to at least one message format adapter for translating data of a Non-Java message format into Java message format.

14. The system of claim 11, wherein said message clients are non-programmable message clients, connected over a telecommunications network to at least one message content adapter for adapting data of a Non-Java message format into lava message format.

15. A computer program, loadable into the memory of one or more computers, which when executed on the one or more computers causes the computer(s) to implement a messaging system for delivering data in the form of messages between message clients, by executing the steps of a message server maintaining client connections, administering client subscriptions to at least one of topics or queues, and the message server receiving and forwarding messages;

the message server initializing and starting a first transport protocol adapter of a plurality of transport protocol adapters;

at least one message client connecting to the message server using a second transport protocol adapter which matches the first transport protocol adapter; and the message client and the message server communicating by means of the first and second transport protocol adapter and using one of a publishlsubscribe pattern or a point-to-point pattern.

* * * * *

UNITED STATES PATENT AND TRADEMARK OFFICE
CERTIFICATE OF CORRECTION

| | | |
|---|---|---|
| PATENT NO. | : 7,489,704 B2 | Page 1 of 1 |
| APPLICATION NO. | : 10/907328 | |
| DATED | : February 10, 2009 | |
| INVENTOR(S) | : Maffeis et al. | |

It is certified that error appears in the above-identified patent and that said Letters Patent is hereby corrected as shown below:

In Col. 7, line 30, claim 11, delete "paint" and insert --point--.

Signed and Sealed this
Third Day of January, 2012

David J. Kappos
*Director of the United States Patent and Trademark Office*